US012639028B2

(12) United States Patent
Zhang et al.

(10) Patent No.: US 12,639,028 B2
(45) Date of Patent: May 26, 2026

(54) PROCESSING METHOD, APPARATUS, AND ELECTRONIC DEVICE

(71) Applicant: Lenovo (Beijing) Limited, Beijing (CN)

(72) Inventors: Xiaolong Zhang, Beijing (CN); Maoyuan Wu, Beijing (CN); Hainan Cai, Beijing (CN); Mingping Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/894,469

(22) Filed: Sep. 24, 2024

(65) Prior Publication Data

US 2025/0123789 A1     Apr. 17, 2025

(30) Foreign Application Priority Data

Oct. 13, 2023     (CN) ........................ 202311331308.X

(51) Int. Cl.
*G06F 3/14*          (2006.01)
(52) U.S. Cl.
CPC ................................. *G06F 3/1454* (2013.01)

(58) Field of Classification Search
CPC .... G06F 3/1454; G06F 9/452; G09G 2370/16
See application file for complete search history.

(56) References Cited

U.S. PATENT DOCUMENTS

2024/0053879 A1 *     2/2024     Wang ....................... G09G 5/14

* cited by examiner

*Primary Examiner* — Koosha Sharifi-Tafreshi

(74) *Attorney, Agent, or Firm* — ANOVA LAW GROUP, PLLC

(57) ABSTRACT

A processing method includes: obtaining node information of display data of a display content, the node information representing the display content, and the display data being used to present the display content for display output; in response to first operation information, based on the node information and the display data, generating a target image, the target image representing a target object; and in response to second operation information, sending the target image through a connection channel. The first operation information and the second operation information are both from a target device connected through the connection channel, and are generated in two stages of performing a same operation on the target object.

20 Claims, 7 Drawing Sheets

Obtaining node information and display data of a display content, the node information representing the display content, and the display data being used to present the display content for output display — S101

In response to first operation information, based on the node information and the display data of the display content, generating a target image, the target image being used to represent a target object — S102

In response to second operation information, sending the target image through a connection channel, the second operation information and the first operation information being both from the target device connected through the connection channel, and are generated in two stages of performing a same operation on the target object — S103

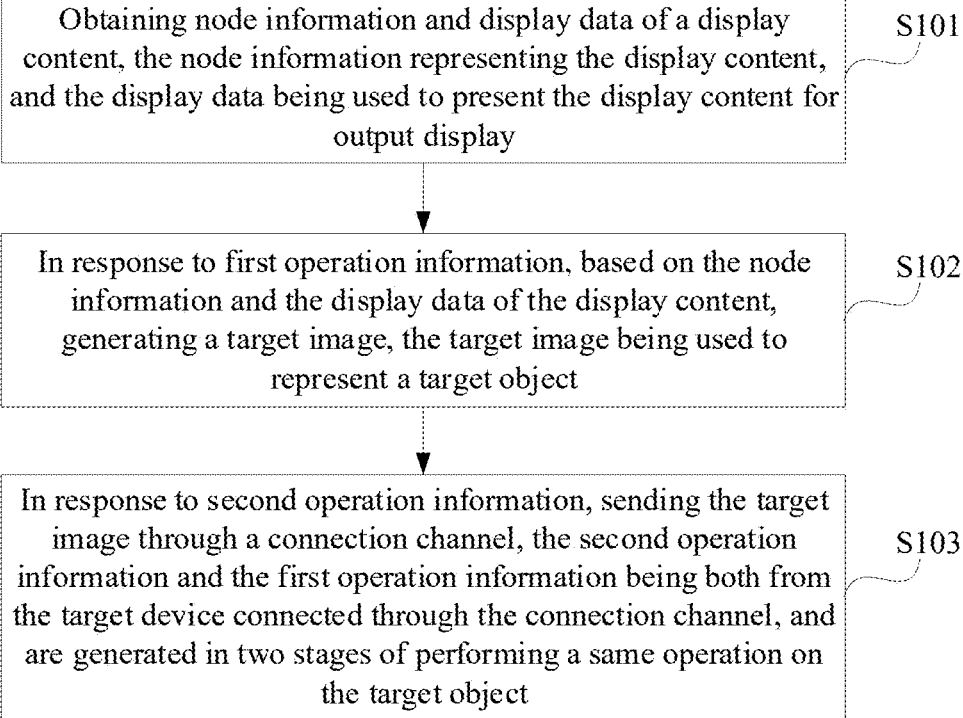

Obtaining node information and display data of a display content, the node information representing the display content, and the display data being used to present the display content for output display

S101

In response to first operation information, based on the node information and the display data of the display content, generating a target image, the target image being used to represent a target object

S102

In response to second operation information, sending the target image through a connection channel, the second operation information and the first operation information being both from the target device connected through the connection channel, and are generated in two stages of performing a same operation on the target object

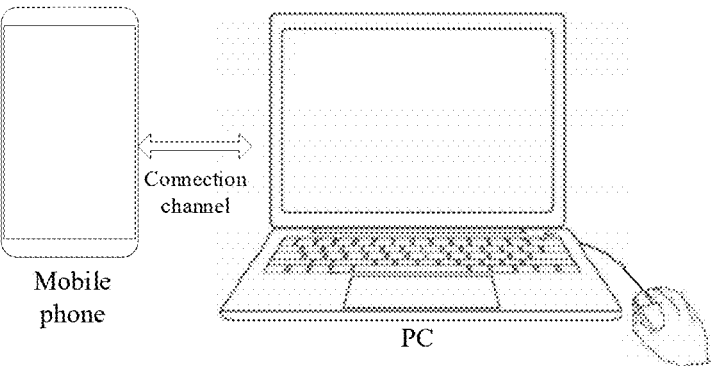

Connection channel

Mobile phone

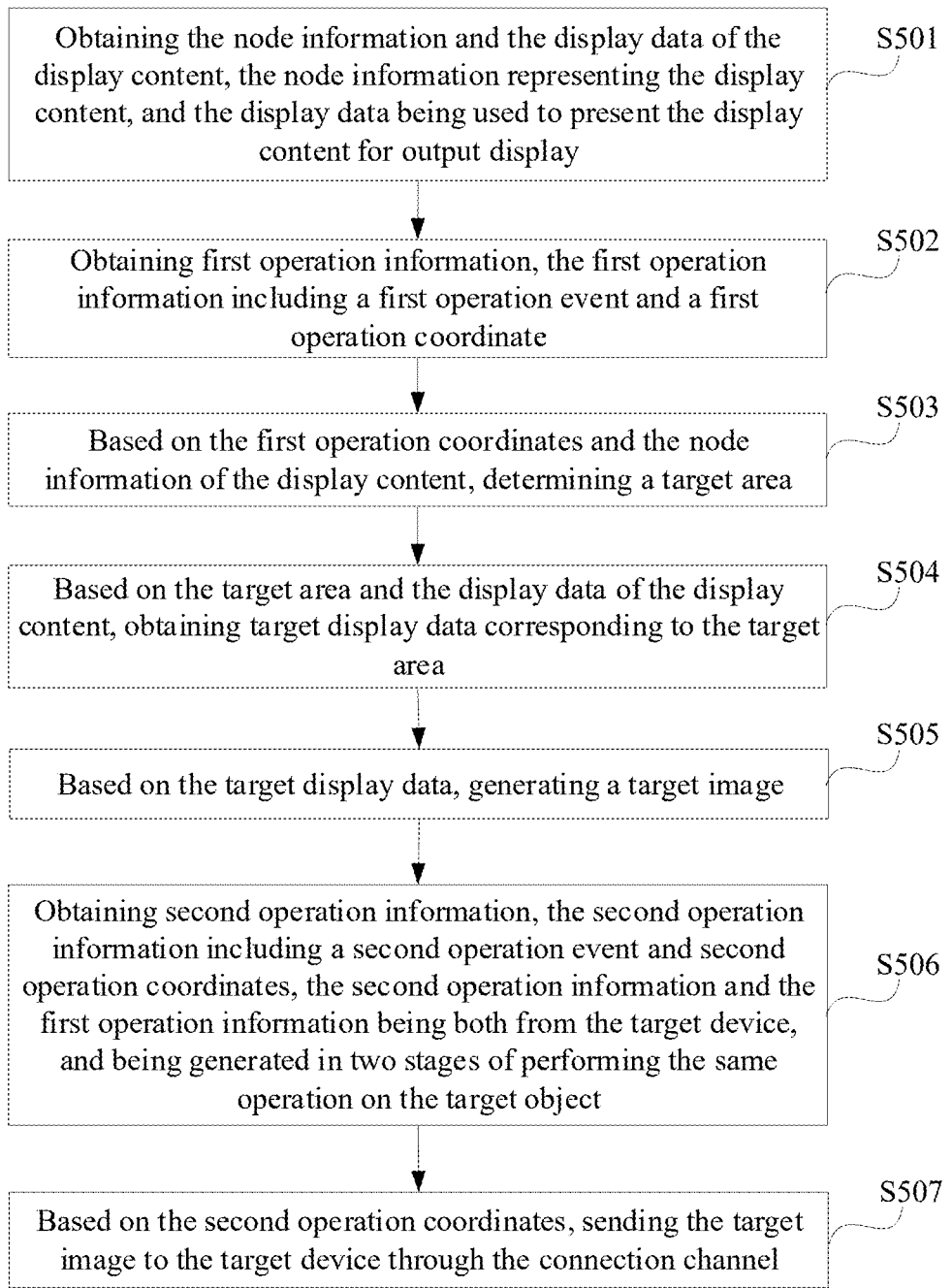

Obtaining the node information and the display data of the display content, the node information representing the display content, and the display data being used to present the display content for output display ⸺ S501

Obtaining first operation information, the first operation information including a first operation event and a first operation coordinate ⸺ S502

Based on the first operation coordinates and the node information of the display content, determining a target area ⸺ S503

Based on the target area and the display data of the display content, obtaining target display data corresponding to the target area ⸺ S504

Based on the target display data, generating a target image ⸺ S505

Obtaining second operation information, the second operation information including a second operation event and second operation coordinates, the second operation information and the first operation information being both from the target device, and being generated in two stages of performing the same operation on the target object ⸺ S506

Based on the second operation coordinates, sending the target image to the target device through the connection channel ⸺ S507

FIG. 5

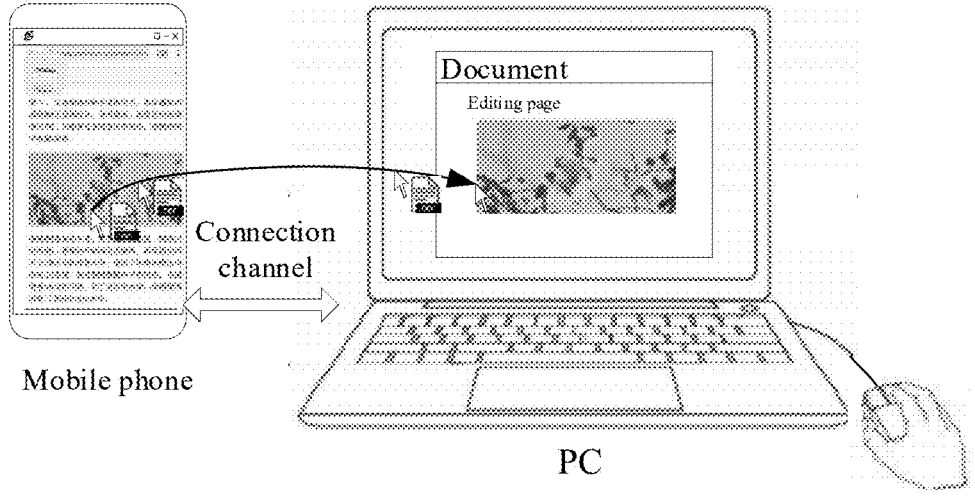
Document
Editing page
Connection channel
Mobile phone
PC
FIG. 7
| Acquisition module 810 | Target image generation module 820 | Target image sending module 830 |
| --- | --- | --- |
Processing apparatus (electronic device)
FIG. 8
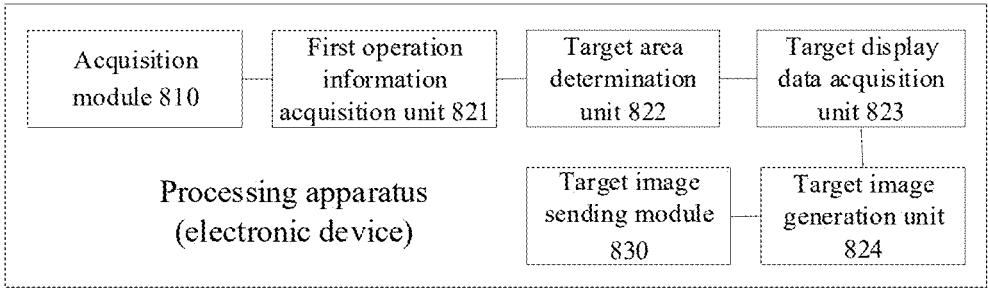
FIG. 9

PROCESSING METHOD, APPARATUS, AND ELECTRONIC DEVICE

CROSS-REFERENCE TO RELATED APPLICATION

This application claims priority to Chinese Patent Application No. 202311331308.X, filed on Oct. 13, 2023, and the entire content of which is incorporated herein by reference.

TECHNICAL FIELD

The present disclosure relates to the technical field of device interconnection applications, and more particularly, to a processing method, a processing apparatus, and an electronic device.

BACKGROUND

With the development of electronic technology and the Internet, users may use multiple electronic devices such as mobile phones, laptops, desktop computers, and smart home devices (such as TVs) to interconnect through wired or wireless methods to satisfy various application needs. For example, the users may use interconnected mobile phones and computers to collaborate on work seamlessly and conveniently.

SUMMARY

One aspect of the present disclosure provides a display method. The method includes: obtaining node information of display data of a display content, the node information representing the display content, and the display data being used to present the display content for display output; in response to first operation information, based on the node information and the display data, generating a target image, the target image representing a target object; and in response to second operation information, sending the target image through a connection channel. The first operation information and the second operation information are both from a target device connected through the connection channel, and are generated in two stages of performing a same operation on the target object.

Another aspect of the present disclosure provides a processing apparatus. The processing apparatus includes a memory storing a computer program and a processor configured to execute the computer program to: obtain node information of display data of a display content, the node information representing the display content, and the display data being used to present the display content for display output; in response to first operation information, based on the node information and the display data, generate a target image, the target image representing a target object; and in response to second operation information, send the target image through a connection channel. The first operation information and the second operation information are both from a target device connected through the connection channel, and are generated in two stages of performing a same operation on the target object.

Another aspect of the present disclosure provides an electronic device. The electronic device includes a display screen used to output and display display data of a display content and to present the display content; a connection port used to connect to a target device to form a connection channel between the electronic device and the target device, and to receive various operation information on a target object sent by the target device through the connection channel; and a processor used to execute a computer program stored in a memory to: obtain node information of display data of a display content, the node information representing the display content, and the display data being used to present the display content for display output; in response to first operation information, based on the node information and the display data, generate a target image, the target image representing a target object; and in response to second operation information, send the target image through a connection channel. The first operation information and the second operation information are both from a target device connected through the connection channel, and are generated in two stages of performing a same operation on the target object.

BRIEF DESCRIPTION OF THE DRAWINGS

To more clearly illustrate the technical solutions in the embodiments of the present disclosure, drawings required for the description of the embodiments are briefly described below. Obviously, the drawings described below are merely some embodiments of the present disclosure. For those skilled in the art, other drawings can be obtained based on these drawings without creative efforts.

FIG. 1 is a flowchart of an exemplary processing method according to some embodiments of the present disclosure;

FIG. 2 is a schematic diagram of a system architecture of an exemplary application environment applicable for a processing method according to some embodiments of the present disclosure;

FIG. 5 is a flowchart of another exemplary processing method according to some embodiments of the present disclosure;

FIG. 7 is schematic diagram of another application scenario of a processing method according to some embodiments of the present disclosure;

FIG. 8 is schematic structural diagram of an exemplary processing apparatus according to some embodiments of the present disclosure;

FIG. 9 is schematic structural diagram of another exemplary processing apparatus according to some embodiments of the present disclosure.

DETAILED DESCRIPTION OF THE EMBODIMENTS

Figure 3:
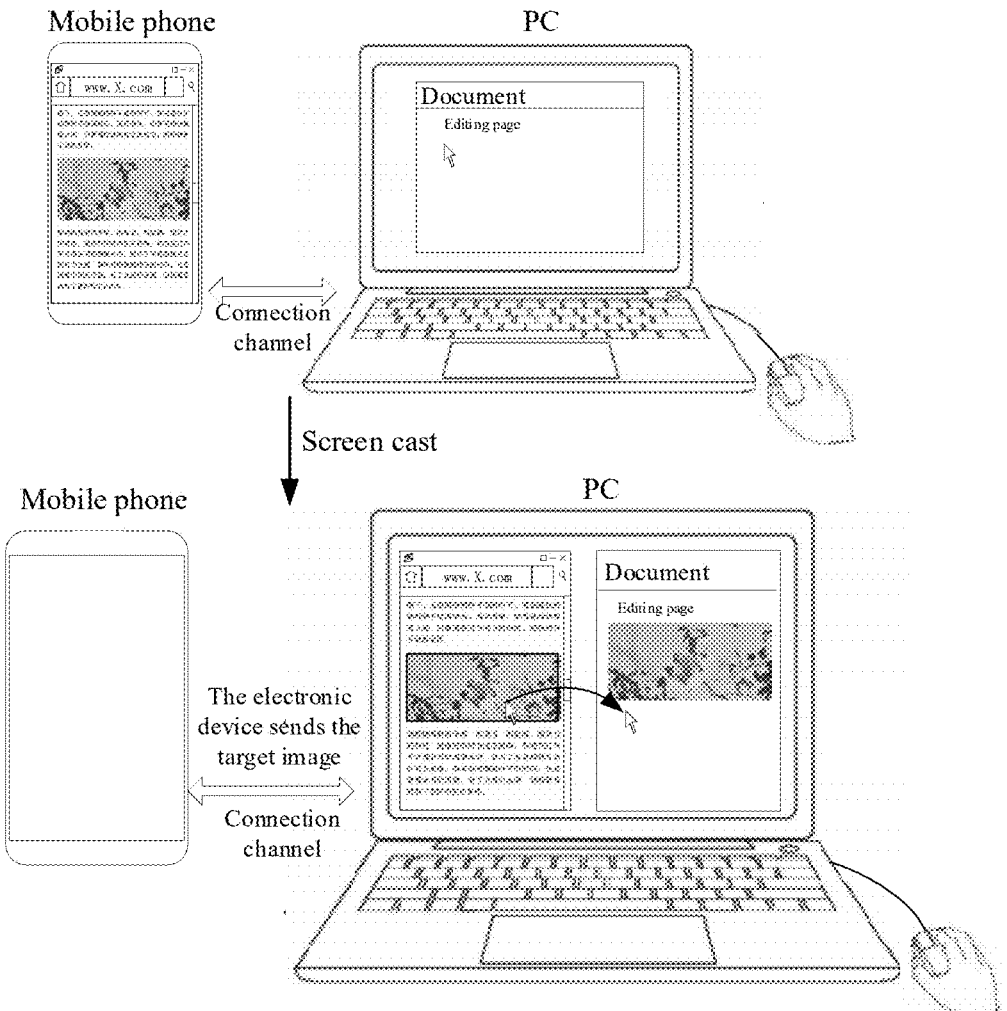
FIG. 3 is schematic diagram of an application scenario of a processing method according to some embodiments of the present disclosure.

The technical solutions in the embodiments of the present disclosure will be clearly and completely described below in conjunction with the drawings in the embodiments of the present disclosure. Obviously, the described embodiment is merely a part of the embodiments of the present disclosure, not all of the embodiments. Based on the embodiments in the present disclosure, all other embodiments obtained by ordinary people in the art without creative work are within the scope of the present disclosure.

FIG. 1 is a flowchart of an exemplary processing method according to some embodiments of the present disclosure. The method may be applied to electronic devices, which may include but are not limited to mobile phones, tablet computers, personal computers (PCs), personal digital assistants (PDAs), wearable devices (i.e., smart watches), smart home devices (i.e., TVs), automobile infotainment systems, game consoles, and augmented reality (AR) and virtual reality (VR) devices. The present disclosure does not impose any restrictions on the specific form of the electronic device. The following embodiments only take the electronic device as a mobile phone as an example for illustration. The processing methods for other forms of electronic devices are similar, and the present disclosure will not provide detailed examples one by one. As such, as shown in FIG. 1, the processing method provided by the embodiments of the present disclosure may include but is not limited to the following processes.

At S101, node information and display data of a display content are obtained. The node information represents the display content, and the display data is used to present the display content for output display.

In some embodiments, the display content may be a page content displayed in a display interface of an application APP loaded by the electronic device, such as the page content loaded when a browser application accesses a website page. The application APP may be a downloadable application, an application pre-installed in the electronic device, or a third-party application downloaded and installed in the electronic device by a user. The present disclosure does not limit the type of application APP and its installation method.

The display content that needs to be processed by the present disclosure comes from a server corresponding to an accessed network address. The display content has no corresponding file stored in the electronic device running the application. Therefore, when it is necessary to drag (select) a part of the display content (for example, the data corresponding to an image), the electronic device is unable to know what the file corresponding to a drag start point (selection) is, so it cannot respond to a drag operation. To identify different contents in the obtained display content, such as pictures in a page loaded by a browser application, the present disclosure does not limit the content type (such as pictures, text, etc.) contained in the display content. The electronic device will obtain the node information of the display content, and the node information will represent the display content, such that the corresponding area content can be determined later by the operated node. The present disclosure does not limit the content of the node information and its representation method.

In some embodiments, the electronic device is configured with an Android system. When it is necessary to identify the display content, the accessibility service AccessibilityService provided by the Android system of the electronic device may be turned on by any triggering method such as a preset shortcut key or voice command, such that the electronic device enters an auxiliary mode. The node information of the display content is obtained by capability of recognizing display screen information of the electronic device, but it is not limited to this acquisition method of the node information.

In actual applications, when it is necessary to display the display content on a display screen (such as a display screen of the electronic device, and/or a target display screen of a target device), the electronic device may render the original data sent by its source to obtain the display data of the display content, such as a pixel value of each pixel point, and may output and display the display data on the display screen, such that the corresponding display content can be presented on the display screen. It can be seen that the display data may be data that can be directly displayed after rendering the display content. The output display of the display data achieves the effect of presenting the display content at the corresponding position on the display screen. The present disclosure does not elaborate on the process of obtaining the display data of the display content.

It should be noted that the present disclosure does not restrict an order of obtaining the node information of the display content and the display data of the display content. After the display data is output and displayed, the display content may be presented on the display screen of the electronic device, and/or projected to the target display screen of the target device connected to the electronic device for display, which may be determined according to a mode of the electronic device. The present disclosure does not restrict the presentation method and object of the display content.

At S102, in response to first operation information, based on the node information and the display data of the display content, a target image is generated. The target image is used to represent a target object. That is, through the above method processes, a target image file corresponding to a starting position (selection operation) of a drag is generated, such that the drag operation can be responded.

Following the above analysis, combined with an application scenario of the processing method proposed in the present disclosure shown in FIG. 2, the electronic device is a mobile phone, and a connection channel is established with the electronic device. The target device for interconnection is a PC. The interconnected mobile phone and PC may share an input device of the electronic device, such as a mouse, a keyboard, a touchpad, etc. FIG. 2 only takes the input device of the mouse as an example for illustration. With the help of keyboard and mouse sharing technology (i.e., using the input device of one terminal to control other terminals), the user may use the input device to operate the mobile phone and the PC. The present disclosure does not elaborate on how to use the input device to operate and control the mobile phone.

Based on the above, when at least part of the displayed content needs to be sent across devices, in the application scenario shown in FIG. 2, part of a display content 1 of the mobile phone needs to be quickly sent to a display content 2 of the PC for display. For example, it is necessary to use the mouse of the PC shared by the mobile phone to insert a picture in a page content (i.e., display content 1) loaded by a browser application of the mobile phone into a document (i.e., a display content 2) output by the PC for display by dragging and other shortcut operations. According to the method described above, the node information and the display data of the page content are obtained, and the display data is output and displayed. After presenting the page content, the user may use the input device of the PC (the mouse shown in FIG. 2, but not limited to the input device) to directly drag the picture in the page content to the display area of the document application. During execution of the above drag operation, it is necessary to start from the picture. For example, when the target object is presented in the display area where the picture to be dragged is located, a pressing operation is performed. The PC detects the operation information generated thereby, such as operation coordinates and operation events (such as input device press events) of the target object, which may be sent to the mobile phone through a connection channel, such that the mobile phone combines the operation information, as well as the node information and the display data of the obtained display content, to generate a target image for representing the target object. The content of the target image may be directly displayed on a display screen to present the content operated in the above display content, such as the picture in the page content loaded by the browser application, etc. The present disclosure does not limit the generation process of the target image.

It should be noted that, combined with the above description of the obtained display content, because the display content may be the page content loaded by the application (which may include but is not limited to any type of application listed above) in the electronic device, the target image generated according to the method described above is an image of the display data corresponding to a content such as a picture or text in the page content loaded by the running application.

S101 is executed when the pressing operation performed on the target object is not ended (such as the mouse button remains in a pressed state), and a moving operation may be continued on the target object subsequently, thereby completing the entire drag operation across devices. In some embodiments, it can be seen that the same drag operation performed on the picture may include the pressing operation, the moving operation, and an end pressing operation performed at different stages. In the application scenario shown in FIG. 2, the pressing operation may be a pressing operation of the mouse button, the moving operation may be a mouse moving operation, and the end pressing operation may be a mouse button releasing operation. Therefore, the pressing operation in a first stage is not a complete operation of the target object, and its continuous execution with other stage operations to be performed subsequently (such as the moving operation, the end pressing operation, etc.) constitutes a complete operation.

In actual applications, the PC may listen to each input event of the target object and obtain corresponding operation information (which may be recorded as the first operation information in the present disclosure), such as the corresponding type of operation event and operation coordinates, etc. At this time, a PC operating system will not respond to the first operation information, and may even directly capture and intercept the first operation information through an input listening method, and may send it directly to the mobile phone through the connection channel for response to complete the content of S102. The present disclosure does not limit the implementation method of how the target device sends the first operation information for the display content to the electronic device. For the mobile phone that shares a PC mouse, a virtual input device may be created to simulate an operation event contained in the first operation information, and then may generate the target image as the response. The present disclosure does not elaborate on the creation and implementation process of the virtual input device, and the implementation method of S102 includes but is not limited to the implementation method described in the present disclosure.

It should be noted that when at least part of the content in the display is transmitted across devices, the process of obtaining the first operation information of the target object, such as the process of obtaining the operation information detected after the first stage of the pressing operation in the entire drag operation, includes but is not limited to the implementation method described in the above example, and may also be performed based on voice recognition technology and implemented through voice command operation. The target object in different operation methods may be different. The present disclosure may be illustrated by using the implementation method of using a mouse to perform the operation as an example. In the voice command operation scenario, the display content may also be output by playback, such that special groups can speak a first stage operation content based on the playback and obtain the first operation information.

In some embodiments, after the user performs the first stage operation on the presented display content, display state parameters of the display data constituting the target image may also be adjusted based on the corresponding first operation information obtained, such as controlling the selected picture to be highlighted, etc., to highlight the content that needs to be sent in the display content. The present disclosure does not limit the display state content and its adjustment control method.

At S103, in response to second operation information, the target image is sent through a connection channel. The second operation information and the first operation information are both from the target device connected through the connection channel, and are generated in two stages of performing the same operation on the target object.

Following the above analysis, the application scenario of establishing a connection channel between the mobile phone and the PC as shown in FIG. 2, and the mobile phone sharing the mouse of the PC to implement the processing method provided by the present disclosure is used as an example for illustration. When it is necessary to drag the display content from the mobile phone to the PC for display, the mouse may be used to drag the display content to a display area of the PC after the pressing operation, such as the entire display area of the PC display screen, or the PC is in a split-screen display mode, and the display area corresponding to a target application display interface where the display content from the mobile phone needs to be inserted, etc., may be determined according to a mode in which the mobile phone and the PC are connected. After the pressing operation is completed, the mobile phone may send the generated target image to the target device through the connection channel, such that the corresponding display area of the target device displays the target image sent by the electronic device and presents the operated content.

Referring to the above description of the process of obtaining the first operation information, the present disclosure may obtain the second operation information according to the corresponding method, that is, the operation information generated in another stage different from the stage of generating the first operation information in the same operation (such as drag operation) performed on the target object. For example, in the above example of dragging the picture from the page content loaded by the browser application running on the mobile phone to the PC document, the user uses the PC mouse, and when a mouse cursor is displayed in the display area of the picture, performs the pressing operation, and sends the detected first operation information to the mobile phone through the connection channel, generates the target image according to the method shown at S102, and determines that it is dragged to a PC document display area. If the target object is displayed in the PC document display area, the user performs the end pressing operation, and sends the detected second operation to the mobile phone through the connection channel, and the mobile phone executes S103 to send the target image. The present disclosure does not describe the process of obtaining the second operation information in detail.

The same operation performed on the target object includes but is not limited to the drag operation performed by the mouse described in the context, and the operation may also be performed using other types of input devices of the target device, such as pre-configured shortcut keys or combination keys for the keyboard, or the first operation information and the second operation information of a voice signal type input at different stages through voice control, which may be determined in combination with the user's habits or needs. The present disclosure does not provide examples and details herein.

Therefore, in the embodiments of the present disclosure, the connection channel is established between the electronic device and the target device, such that the electronic device can share the input device of the target device, that is, the user can use the input device to complete the input operation of the display content presented by the electronic device and the target device respectively. In the scenario where part of the display content from the electronic device needs to be quickly sent to another display content of the target device for display, the electronic device may obtain the node information and the display data of the display content, and then may obtain the first operation information of the target object from the target device. In the process of responding to the first operation information, the node information and the display data may be combined to generate the target image representing the target object, and the target image may be sent directly through the connection channel in response to the second operation information of the target object from the target device.

It can be seen that when the display content of the electronic device is the content of a third-party application, regardless of whether the third-party application supports saving of pictures, such as a function of saving pictures in the third-party application, according to the processing method of the present disclosure, the pictures in the display content of the third-party application in the electronic device may be quickly sent to the target device, thereby improving transmission efficiency and reliability of the display content across devices.

Combined with the above description of the processing method provided by the present disclosure, the process of obtaining the node information of the display content may be performed only after a preset trigger condition is met. For example, for the electronic device with an Android system, the node information of the display content may be obtained only after an accessibility service function of the Android system is turned on and a corresponding auxiliary mode is entered. For other pre-configured content preset trigger conditions, it can also be determined whether to obtain the node information of the display content according to any of the implementation methods described below, but not limited thereto.

In a first implementation example, the electronic device may determine that the connection channel for connecting the target device is successfully established before executing the process of obtaining the node information of the display content. The connection channel may be established by wireless means such as WIFI, Bluetooth or near-field communication to transmit data according to the corresponding communication protocol. The present disclosure does not elaborate on the establishment implementation process of the connection communication and its communication principle.

In a second implementation example, the electronic device may determine to enter a first mode for the target device before executing the process of obtaining the node information of the display content. The first mode may include the electronic device transmitting the display content (which may be the content obtained but not displayed by the electronic device, or the content already displayed by the electronic device) to the target object, to present the display content on the target display screen of the target object. At this time, the display content may not be presented on the display screen of the electronic device, as shown in a screen projection application scenario in FIG. 3, such that the user can perform other operations on the electronic device. In some embodiments, at this time, the display content may also be presented on the display screen of the electronic device, that is, the display content is displayed on the display screen of the electronic device, and the display content is transmitted to the target device through the connection channel, and is displayed simultaneously on the target display screen of the target device. The accompanying drawings do not show this application scenario, and the present disclosure does not limit the application scenario of the electronic device in the first mode.

In a third implementation example, the electronic device may also perform the process of obtaining the node information of the display content after determining that it is in a second mode. The second mode may include obtaining coordinate information sent by the target device through the connection channel (which is connected to the target device) for indicating a movement of the target object (which is used to operate the display content of the electronic device), and displaying the target object based on the coordinate information. In the application scenario shown in FIG. 4A, a cursor (i.e., a mouse pointer) displayed on the display screen of the PC may be moved across the display screen and displayed on the mobile phone, etc.

In some embodiments, the keyboard and mouse sharing mode may be turned on on the PC to share its own input device with the mobile phone connected to the PC, such that the user may operate the PC mouse and display the mouse pointer on the display content of the mobile phone to implement operations on the display content. Based on this, the PC may listen to various operation events performed using the mouse through a listener for the mouse pointer, and coordinate information corresponding to the mouse pointer, i.e., operation coordinates corresponding to an operation event, and may send it to the mobile phone through the connection channel. The mobile phone receives the coordinate information through the connection channel. In a mode of displaying the mouse pointer on its own display screen, the mobile phone will obtain the node information of the display content. It should be noted that the content of the second mode of the electronic device includes but is not limited to the scenario described in the above example.

In a fourth implementation example, the electronic device may obtain the coordinate information sent by the target device through the connection channel (as analyzed above, the coordinate information is used to display the target object), for example, the mouse pointer of the PC has been moved across the screen to display on the display screen of the mobile phone, and the node information of the displayed content may be obtained. Regarding the processes after obtaining the node information of the displayed content in the above various implementations, the description of the corresponding part of the context examples may be referred to, and detail one-by-one description thereof will be omitted in the present disclosure.

In some embodiments, combined with the above description of the first mode and the second mode of the electronic device, in the implementation process of the processing method provided by the present disclosure, the electronic device may be in different modes, and an acquisition process of the first operation information and the second operation information in the context examples may be different.

If the electronic device is in the first mode, when transmitting the display content of the electronic device to the target device to be presented on the target display screen of the target device, referring to but not limited to the application scenario shown in FIG. 3, the electronic device may obtain the first operation information and the second operation information generated by the two nodes that perform the same operation on the target object presented on the target display screen through the connection channel. It can be seen that in the first mode, the target object (such as the mouse pointer) of the input device of the target device is displayed on the target display screen, and the input device is directly moved to control the target object to move to the display area where the content to be sent in the display content from the electronic device presented on the target display screen is located, and the first stage of the same operation is started, such as the pressing operation included in the drag operation performed in a cross-device drag picture scenario, and the target device sends the corresponding first operation information detected to the electronic device.

Figures 4A, 4B:
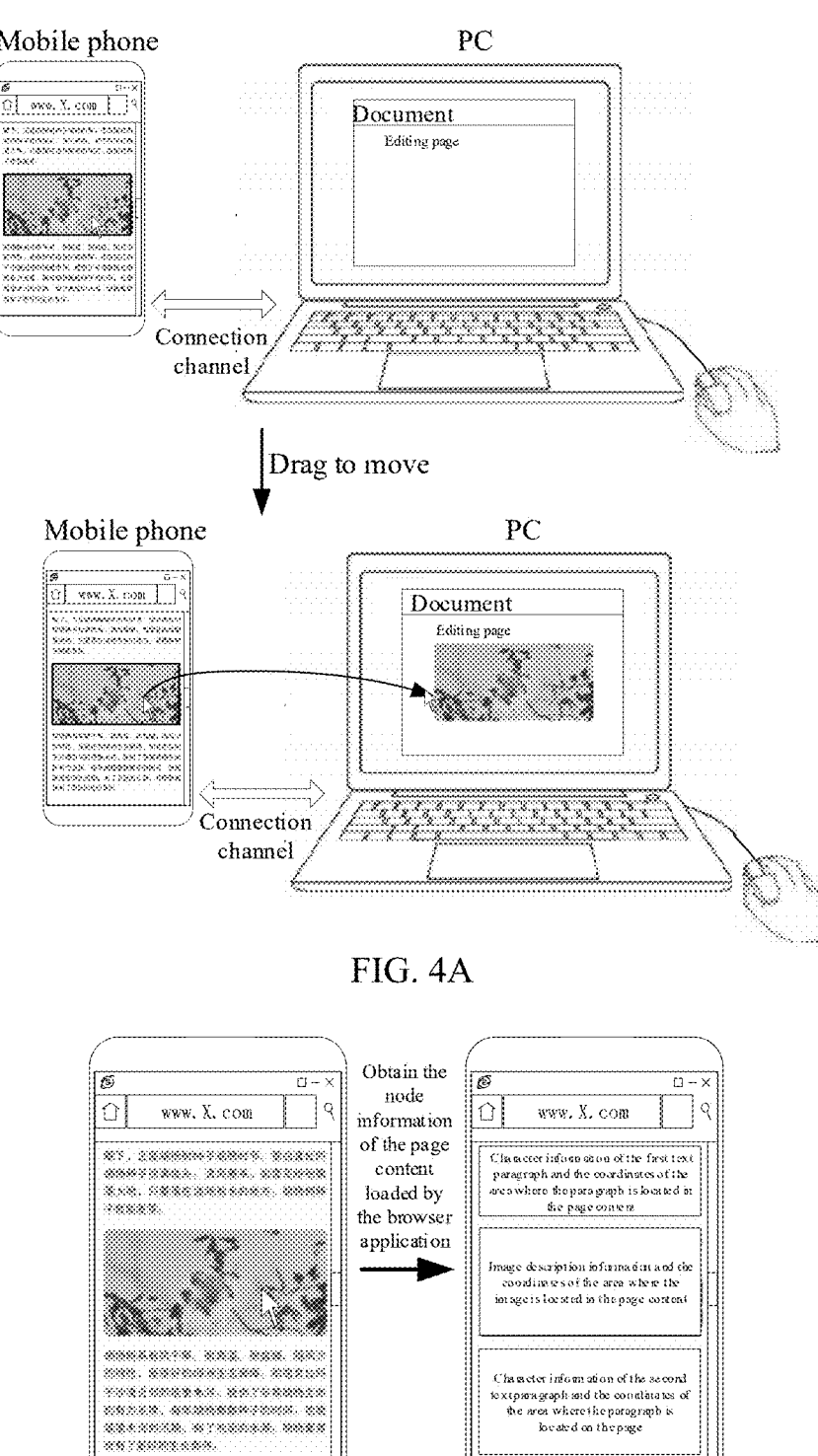
FIG. 4A is schematic diagram of another application scenario of a processing method according to some embodiments of the present disclosure.
FIG. 4B is schematic diagram of an application scenario of obtaining node information of a display content in a processing method according to some embodiments of the present disclosure.

While the electronic device is in the second mode, because the display content of the electronic device is transmitted to the target device, as shown in FIG. 4A, the display content from the electronic device may not be displayed on the target display screen of the target device. In this case, the input device of the target device needs to be shared with the electronic device such that the target object can be moved across the screen to be presented on the display screen of the electronic device, as shown in FIG. 4A where the cursor of the PC mouse is presented on the display screen of the mobile phone. In this mode, the operation performed by the user operating the input device is the operation performed on the target device presented on the display screen of the electronic device. The target device obtains the operation information generated at each stage in the process of the operation and sends it to the electronic device through the connection channel. The electronic device responds to the operation information and implements subsequent processing according to the description in the corresponding steps of the processing method provided in the present disclosure.

FIG. 5 is a flowchart of another exemplary processing method according to some embodiments of the present disclosure. The method may be performed by the electronic device. A detailed implementation process of the processing method described above is provided. As shown in FIG. 5, the processing method may include the following processes.

At S501, the node information and the display data of the display content are obtained. The node information represents the display content, and the display data is used to present the display content for output display.

Regarding the implementation process of S501, reference can be made to the description of the corresponding part of the previous embodiments, such as the description of the corresponding part of S101, and the detail description thereof will not be repeated herein.

In some embodiments, when it is determined that S501 needs to be executed, in an optional implementation method of obtaining the node information of the display content, the electronic device may obtain multiple nodes contained in the display content. The multiple nodes may include first-class nodes and second-class nodes. Each first-class node may include a unit quantity (such as a paragraph, etc.) character information and the unit quantity character is located in area coordinates of the display content, and each second-class node includes picture description information and the picture is located in the area coordinates of the display content, etc.

In combination with the example of the display content of the electronic device given in the application scenario shown in FIGS. 3 and 4A above, after a barrier-free service function of the electronic device is turned on, the node information of the display content of the electronic device may be obtained based on the barrier-free service function. As shown in this example, with reference to a scenario schematic diagram of the node information of the display content obtained as shown in FIG. 4B, the page content loaded by the browser application (which may include the content already presented on the mobile phone display screen, and part of the content of the same page that has been loaded but not presented by the browser application) is allocated into multiple nodes. For a text part, the content of each paragraph may be allocated as a node, recorded as a first-class node, and the content of a picture may be allocated as a node, recorded as a second-class node. The present disclosure is not limited to this node allocation method, and the node allocation may be determined according to a configuration file of the barrier-free service function. The present disclosure only uses this as an example for illustration.

To accurately represent the nodes allocated from the entire display content, display screen information recognition capability that the electronic device already has may be used to identify character information belonging to each first-class node in the display content and the regional coordinates of the corresponding characters in the entire display content, and obtain image description information of each second-class node, and identify the regional coordinates of the corresponding described image in the entire display content, such that the coordinate information of the target object of the operation can be used to determine which part of the display content is to be displayed in the target device.

It should be noted that the method for obtaining the node information of the display content of the electronic device includes but is not limited to the implementation of the barrier-free service function described in this example. When other service functions configured by the electronic device have the ability to recognize the display content, the other service functions may also be called to obtain the node information of the display content. The implementation process is not described in detail in the present disclosure.

When the accessibility service function of the electronic device is turned off, the electronic device may enter a third mode, such as a content reading mode, and may no longer obtain node information of the displayed content, but may still obtain operation information from the target device (which is another operation performed on the target object that is different from the operation performed to generate the first operation information and the second operation information mentioned above). In response to the operation information, the display content presented on the display screen of the electronic device is adjusted, such as page turning display.

At S502, first operation information is obtained. The first operation information includes a first operation event and a first operation coordinate.

Regarding the process of obtaining the first operation information of the target object, reference can be made to the description of the corresponding part of the previous embodiment, and the processing method provided by the present disclosure will not be described in detail herein. This processing method may be applied to the application scenarios shown in FIG. 3 and FIG. 4A, where the user uses the mouse of the PC to move the target object to the display area where the picture is located in the page content loaded by the browser application from the mobile phone, and performs the pressing operation as an example for illustration. At this time, the first operation event may be a mouse press event, and the first operation coordinate may be the coordinate information of the target object presentation position when the mouse press event is performed.

At S503, based on the first operation coordinates and the node information of the display content, a target area is determined.

At S504, based on the target area and the display data of the display content, target display data corresponding to the target area is obtained.

At S505, based on the target display data, a target image is generated.

Combined with the above description of the node information of the display content, after obtaining the first operation coordinates of the target object, it can be compared with area coordinates in each node contained in the display content to determine which area coordinate the first operation coordinate belongs to, thereby determining the target area in the display content determined by the first operation event, such as four vertex coordinate information of a bounding box of the picture area shown in FIG. 3.

Subsequently, the target display data corresponding to the determined target area may be obtained from the display data of the entire display content. In the application scenario shown in FIG. 3, the cursor is located in the picture display area and the pressing operation is performed to obtain the picture display data. Combined with the description of the display data of the display content in the corresponding part of S101 of the previous embodiment, the display data is the data displayed on the display screen on a rendering layer of the electronic device, and it is directly stored as a file in a picture format, that is, the target image. In this way, when the display content is the page content of a third-party application, there is no need to pay attention to whether the third-party application supports a picture saving function in the page content. The processing method provided by the present disclosure may obtain the target image for displaying the picture, which improves the scope of application of cross-device transmission of the display content, substantially reduces the execution processes, and improves efficiency of cross-device transmission of the display content.

At S506, second operation information is obtained. The second operation information includes a second operation event and second operation coordinates. The second operation information and the first operation information are both from the target device, and are generated in two stages of performing the same operation on the target object.

At S507, based on the second operation coordinates, the target image is sent to the target device through the connection channel.

Regarding the generation and acquisition process of the second operation information, reference can be made to the description of the corresponding part of the previous embodiments. After obtaining the second operation information from the target device through the connection channel, the electronic device determines that the second operation event contained therein is an operation completion event, such as the end pressing event corresponding to the end pressing operation, etc. In the application scenario shown in FIG. 3 and FIG. 4A, the user releases a mouse button, the PC listens to the second operation event, identifies the corresponding second operation coordinates, and sends the second operation information thus formed to the mobile phone through the connection channel. In the process of sending the currently generated target image through the connection channel in response to the second operation information, the mobile phone may determine that the second operation event is the end pressing event or a leaving event in which the target object moves away from the display screen of the electronic device. Based on the corresponding second operation coordinates, it is determined to which device the target image is sent, to send the target image through the corresponding connection channel, such that the device receives the target image and outputs it, to directly display the corresponding content on its display screen.

In the application scenario shown in FIG. 3, the electronic device determines that the target object moves away from the right side of the display content presented by the mobile phone based on the second operation coordinates in the obtained second operation information, and determines to send the corresponding target image to the PC located on the right side of the mobile phone. Because the target image is the picture of the target display data on the rendering layer, the PC may directly display the target image, such as presenting the picture in the page content loaded by the browser application in the mobile phone in the document output by the PC, that is, quickly inserting the picture in the page content loaded by the mobile phone browser application into the PC document, and the PC does not need to perform rendering operations.

In some embodiments, if the PC displays the display interfaces of multiple applications before dragging the picture, such as multiple documents, the target image is sent to the target device according to the method described above. The target device may obtain the coordinate information of the target object when the end pressing event is generated, and may determine which application of the PC to send the target image to display in combination with the display area coordinates of each of the multiple display interfaces in the PC. This process may be implemented after the PC receives the target image, and the present disclosure does not describe the implementation process in detail.

It should be noted that the implementation process of the electronic device sending the target image through the connection channel connected to the target device in response to the second operation information includes but is not limited to the implementation method described above. Regarding the transmission of the target image through the connection channel described in the previous embodiments, the target image can be sent according to the communication protocol supported by the connection channel, that is, the communication transmission mechanism. The present disclosure does not elaborate on the implementation process of sending the target image.

Figure 6:
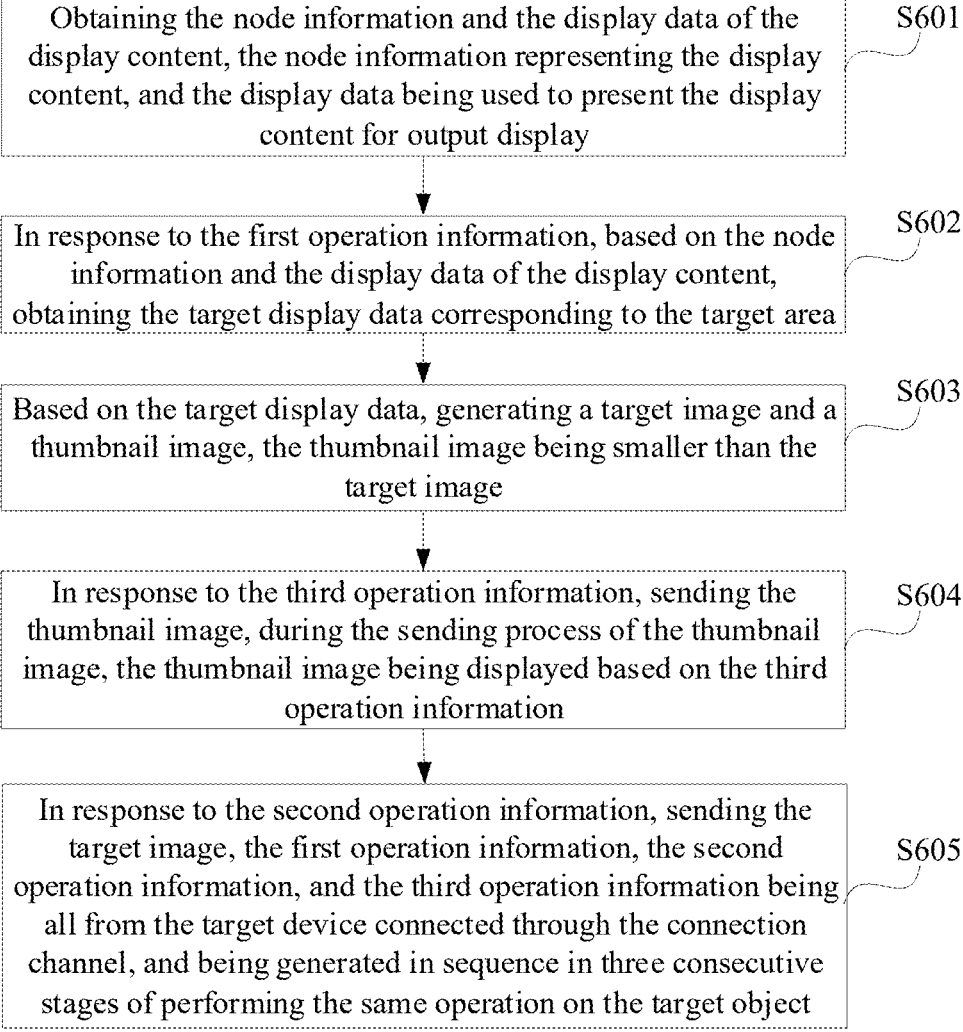
FIG. 6 is a flowchart of another exemplary processing method according to some embodiments of the present disclosure.

FIG. 6 is a flowchart of another exemplary processing method according to some embodiments of the present disclosure. The processing method may be performed by the electronic device. This embodiment may be an optional extended implementation of the processing method described in the previous embodiments. As shown in FIG. 6, the processing method may include the following processes.

At S601, the node information and the display data of the display content are obtained. The node information represents the display content, and the display data is used to present the display content for output display.

At S602, in response to the first operation information, based on the node information and the display data of the display content, the target display data corresponding to the target area is obtained. Regarding the implementation process of S601 and S602, reference can be made to the corresponding part of the description of the previous embodiments, and the detail description thereof is omitted herein.

At S603, based on the target display data, a target image and a thumbnail image are generated. The thumbnail image is smaller than the target image.

In some embodiments, in combination with the application scenario shown in FIG. 7, the user is interested in the image in the page content loaded by the browser application of the mobile phone, and clicks the image with the mouse of the PC. After automatically identifying the target display data of the image according to the above processes, the corresponding target image may be generated, and the thumbnail image of the target image may also be generated, for example, the thumbnail in TXT format as shown in FIG. 7, or the thumbnail image in other formats. The present disclosure does not describe the method for generating the thumbnail image in detail, such that the user can check whether the target image to be sent is correct through the thumbnail image.

At S604, in response to the third operation information, the thumbnail image is sent. During the sending process of the thumbnail image, the thumbnail image is displayed based on the third operation information.

Following the above analysis, after the starting stage (such as the above first stage) of performing the same operation on the target object, in an immediately subsequent stage, such as a long pressing on the mouse to perform a moving operation (i.e., the third stage operation in the dragging operation), the target device may obtain the third operation information, and send the third operation information to the electronic device through the connection channel, such that the electronic device can obtain the third operation information, which includes the third operation event (such as the moving event) and its corresponding third operation coordinates (such as the coordinate information of the moving trajectory of the target object). Thus, the electronic device can send the thumbnail image based on the third operation coordinates.

In some embodiments, as shown in FIG. 7, in the process of sending the thumbnail image, the thumbnail image may be displayed based on the third operation coordinates, that is, the display position of the thumbnail image may change with a change of the third operation coordinates of the target object, such that the displayed thumbnail image can be synchronously moved and displayed according to the moving trajectory of the target object, and the implementation process is not limited by the present disclosure.

In some other embodiments, the present disclosure may also generate a corresponding thumbnail mark or display a pre-configured drag mark based on the display data of the display content, and may control a synchronous display with the moving trajectory of the target object according to the method described above, such that the user can intuitively know a sending path of the target image through the displayed thumbnail image.

It should be noted that in the process of sending the thumbnail image based on the third operation information, the thumbnail image may not be displayed, and whether to display the thumbnail image may be determined according to the pre-configured requirements. In some embodiments, after the third operation information is obtained, it is also possible not to generate the thumbnail image, and the moving path of the target object is displayed based on the third operation coordinates, etc. The implementation process is not described in detail in the present disclosure.

At S605, in response to the second operation information, the target image is sent. The first operation information, the second operation information, and the third operation information are all from the target device connected through the connection channel, and are generated in sequence in three consecutive stages of performing the same operation on the target object.

Regarding the implementation process of S605, references can be made to the description of the relevant parts of the second operation information and the target image in the previous embodiments, and this embodiment will not be described in detail herein. In the application scenario shown in FIG. 3 and FIG. 4A, the user clicks on the picture of the page content loaded by the mobile browser application, and after the target image is generated according to the above method, the user moves the PC mouse, that is, performs a drag-and-drop operation, and the thumbnail image of the picture may be displayed as needed, and may also be displayed synchronously according to the mouse movement trajectory, until the cursor moves to the display interface of the PC document application and the mouse is released. The picture in the page content loaded by the mobile browser application may be inserted into the document output by the PC.

The target image sent by the mobile phone is based on the node information and the display data of the page content loaded by the browser application. Combined with the obtained first operation information, after the target display data of the image is determined, the target display data that can be directly output and displayed is generated. Regardless of whether the browser application supports the image saving function, the present disclosure quickly sends the generated target image to the PC by dragging the image of the page content loaded by the browser application. The PC no longer needs to perform image rendering operations and directly displays the target image in the document, that is, inserts the image of the page content loaded by the mobile browser application into the document output by the PC for display. The operation is easy to perform and improves user experience.

It should be noted that the dragged content includes but is not limited to the picture of the page content loaded by the mobile browser application. According to the method described above, multiple pictures in the page content may be dragged, and the text content of some paragraphs may be selected and dragged to be inserted into the PC document for display. That is, in the processing method described in the previous embodiments, the determined target area may be an area where the display content contains one or more nodes among multiple nodes (which may be multiple nodes of the same type, such as multiple first-class nodes or multiple second-class nodes, or multiple nodes of different types, such as at least one first-class node and at least one second-class node, etc.) The processing methods in these scenarios are similar to the processing methods described in the previous embodiments, and the present disclosure will not provide detail description with examples.

In addition, a system structure of the application scenario to which the processing method provided by the present disclosure is applicable includes but is not limited to the scenario of interconnection between the mobile phone and the PC as shown in FIG. 2, and may also be an application scenario after interconnection of more devices (including but not limited to the various types of terminals listed in the present disclosure). For the content transmission between any two devices, it can be implemented according to the processing method described in the previous embodiments, and the present disclosure will not provide detail description with examples one by one.

FIG. 8 is schematic structural diagram of an exemplary processing apparatus according to some embodiments of the present disclosure. As shown in FIG. 8, the processing apparatus may include an acquisition module 810, a target image generation module 820, and a target image sending module 830.

The acquisition module 810 is used to obtain the node information and the display data of the display content. The node information represents the display content, and the display data is used to present the display content for display output.

The target image generation module 820 is used to generate the target image based on the node information and the display data in response to the first operation information. The target image is used to represent the target object.

The target image sending module 830 is used to send the target image through the connection channel in response to the second operation information.

The first operation information and the second operation information are both from the target device connected through the connection channel, and are generated in two stages of performing the same operation on the target object.

In some embodiments, before the acquisition module 810 is executed, any of the following determination modules or coordinate information acquisition module may also be included.

The first determination module is used to determine that the connection channel is successfully established, triggering the acquisition module 810 to obtain the node information of the display content. The connection channel is used to connect to the target device.

The second determination module is used to determine that the first mode for the target device is entered, triggering the acquisition module 810 to obtain the node information of the display content. The first mode includes: transmitting the display content to the target device to present the display content on the target display screen of the target device.

The third determination module is used to determine that it is in the second mode, triggering the acquisition module 810 to obtain the node information of the display content. The second mode includes: obtaining the coordinate information sent by the target device to indicate the movement of the target object through the connection channel, and displaying the target object based on the coordinate information. The target object is used to operate the display content, and the connection channel is used to connect to the target device.

The coordinate information acquisition module is used to obtain the coordinate information sent by the target device through the connection channel, triggering the acquisition module 810 to obtain the node information of the display content. The coordinate information is used to display the target object.

In the practical application of the present disclosure, in the first mode, the display content is sent to the target device for the target object to be presented on the target display screen of the target device. The first operation information and the second operation information generated by the two stages of performing the same operation on the target object presented on the target display screen are obtained through the connection channel. In the second mode, the first operation information and the second operation information generated by the input device of the target device performing an operation on the target object presented on the display screen of the electronic device are obtained through the connection channel when the display content is not sent to the target device.

In some embodiments, the acquisition module 810 may include: a first acquisition unit, used to obtain multiple nodes contained in the display content and a second acquisition unit, used to obtain display data of the display content. The multiple nodes include the first-class nodes and the second-class nodes.

Each first-class node includes unit character information and regional coordinates of the unit character located in the display content, and each second-class node includes picture description information and regional coordinates of the picture located in the display content.

FIG. 9 is schematic structural diagram of another exemplary processing apparatus according to some embodiments of the present disclosure. Based on the processing apparatus described in the previous embodiments, as shown in FIG. 9, the target image generation module 820 may include a first operation information acquisition unit 821 for obtaining the first operation information which includes the first operation event and the first operation coordinate; a target area determination unit 822 for determining the target area based on the first operation coordinate and the node information; a target display data acquisition unit 823 for obtaining the target display data corresponding to the target area based on the target area and the display data; and a target image generation unit 824 for generating the target image based on the target display data.

Based on the above description of the processing apparatus, the processing apparatus may further include: a thumbnail image generation module, used to generate the thumbnail image based on the target display data, the thumbnail image being smaller than the target image; and a thumbnail image sending module, used to send the thumbnail image in response to the third operation information. The third operation information is generated between two stages of performing the same operation on the target object.

In some embodiments, the processing apparatus may further include: a thumbnail image display module, used to display the thumbnail image based on the third operation information during the sending of the thumbnail image.

It should be noted that the various modules, units, etc. in the above apparatus embodiments may be stored in a memory as program modules, and a processor executes the above program modules stored in the memory to implement the corresponding functions. For the functions implemented by each program module and its combination, as well as the technical effects achieved, references can be made to the description of the corresponding part of the method embodiments, which will not be repeated herein.

The present disclosure also provides a computer-readable storage medium, on which at least one computer instruction set can be stored. The processing apparatus implements the processing method provided by the present disclosure by executing the computer instructions. Regarding the implementation process of the processing method, references can be made to the description of the corresponding part of the method embodiments, and the present disclosure will not provide detailed examples one by one herein.

Figure 10:
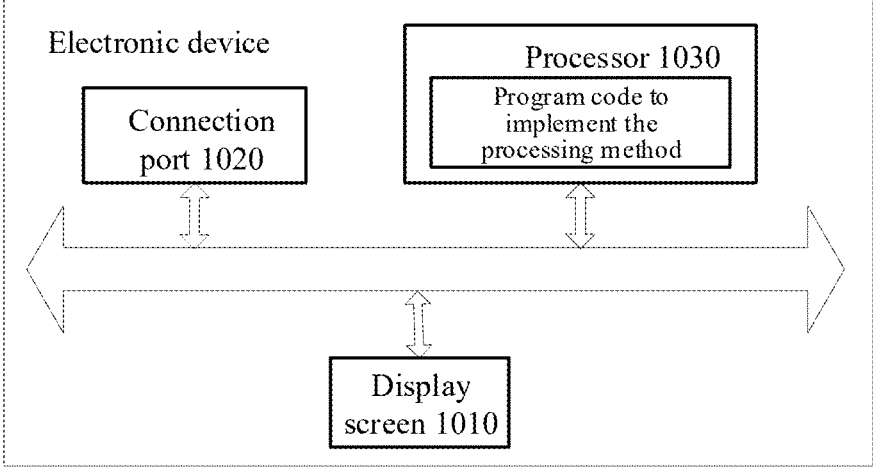
FIG. 10 is a schematic diagram of a hardware structure of an exemplary electronic device for performing a processing method according to some embodiments of the present disclosure.

FIG. 10 is a schematic diagram of a hardware structure of an exemplary electronic device for performing a processing method according to some embodiments of the present disclosure. In combination with the application scenarios shown in FIG. 2, FIG. 3, FIG. 4A, and FIG. 7, as shown in FIG. 10, the electronic device may include a display screen 1010, a connection port 1020, and a processor 1030.

The display screen 1010 may be used to output and display the display data of the display content and to present the display content. The display screen 1010 may include a display panel. The display panel may be a liquid crystal display (LCD), an organic light-emitting diode (OLED), an active-matrix organic light-emitting diode or an active-matrix organic light-emitting diode (AMOLED), a flexible light-emitting diode (FLED), a quantum dot light-emitting diode (QLED), etc. In some embodiments, the electronic device may include one or more display screens, and a layout of the display screen and the content display principle thereof are not described in detail in the present disclosure.

The connection port 1020 may be used to connect to the target device to form the connection channel between the electronic device and the target device, and may receive various operation information of the target object sent by the target device through the connection channel, such as the first operation information, the second operation information, and the third operation information, etc. It should be understood that these three operation information are generated in sequence in three stages of performing the same operation on the target object. After each operation information is detected by the target device, it is sent to the electronic device through the connection channel. The implementation process of the embodiment of the present disclosure is not described in detail herein.

In some embodiments, the connection port 1020 may be a communication element corresponding to a wireless communication method such as Wi-Fi, Bluetooth, and/or a near-field channel method, such that the electronic device can achieve data interaction with other devices (such as the target device or other devices) through the communication element based on the corresponding communication mechanism. The present disclosure does not limit a composition structure of the communication element 1020 and its corresponding communication mechanism, which may be determined according to the actual applications.

Of course, the connection port 1020 may also be a port that supports wired connection between the electronic device and the target device, such as a corresponding type of USB interface, etc., and may also include one or more interfaces that achieve the communication connection between the content components of the electronic device, such as a general-purpose input/output (GPIO) interface, a USB interface, a universal asynchronous receiver/transmitter (UART) interface, etc. The type and quantity of the connection port 1020 may be determined according to the data transmission requirements, which is not limited by the present disclosure. The data interaction may be carried out between the components in the electronic device through a communication bus, such as a data bus, an instruction bus, etc.

The processor 1030 may be used to obtain the node information and the display data of the display content; in response to the first operation information, generate the target image based on the node information and the display data; and in response to the second operation information, send the target image through the connection channel connected to the target device. The node information represents the display content, and the target image is used to indicate the target object. Regarding the implementation process of these processing steps by the processing circuit 1030, references can be made to the description of the corresponding part of the method embodiments, and detail description thereof is omitted herein.

In some embodiments, the processor 1030 may include at least one storage unit and at least one processing unit. The processing unit may execute the program code stored in the storage unit to implement the processing method provided by the present disclosure. The at least one processing unit may include an application processor (AP), a modem processor, a graphics processing unit (GPU), an image signal processor (ISP), a controller, a video codec, a digital signal processor (DSP), a central processing unit (CPU), an application-specific integrated circuit (ASIC), an off-the-shelf programmable gate array (FPGA) or other programmable logic devices, etc. The storage unit may include a high-speed random-access memory (RAM), and may also include a non-volatile memory, such as at least one disk storage device or other non-volatile solid-state storage device, etc. The present disclosure does not limit the composition structure of the processor 1030.

In some embodiments, in the case where the processor 1030 includes a built-in storage space, such as the processors listed above, etc., it is not necessary to integrate or connect the memories listed above. The processor 1030 may directly implement the processing method provided by the present disclosure.

It should be understood that the structure of the electronic device shown in FIG. 10 does not constitute a limitation on the electronic device in the embodiments of the present disclosure. In practical applications, the electronic device may include more or fewer components than those shown in FIG. 10, or combine certain components, for example, at least one input component such as a camera, a microphone, etc., at least one output component such as a speaker, a vibration mechanism, a lamp, etc., a sensor module including various sensors, a power management module, an antenna, etc. The hardware structure may be determined according to the type of the electronic device and functional requirements thereof, and the present disclosure does not list them one by one herein.

Therefore, it should be noted that, with respect to the above embodiments, unless the context clearly indicates an exception, the words "one", "a", "a kind" and/or "the" do not specifically refer to the singular, but may also include the plural. Generally, the terms "include" and "comprise" only indicate that the processes and elements that have been clearly identified are included, and these processes and elements do not constitute an exclusive list, and the method or device may also include other processes or elements. The elements defined by the sentence "include one . . . " do not exclude the existence of other identical elements in the process, method, commodity or device that includes the elements.

In the description of the embodiments of the present disclosure, unless otherwise specified, "/" means or, for example, A/B can mean A or B. "and/or" in the specification is only a description of the association relationship of the associated objects, indicating that there can be three relationships, for example, A and/or B can mean: A exists alone, A and B exist at the same time, and B exists alone. In addition, in the description of the embodiments of the present disclosure, "multiple" means two or more.

The terms such as "first" and "second" involved in the present disclosure are merely used for descriptive purposes to distinguish one operation, unit or module from another operation, unit or module, and do not necessarily require or imply any such actual relationship or order between these units, operations or modules. And it cannot be understood as indicating or implying relative importance or implicitly indicating the number of technical features indicated, thus, the features defined as "first" and "second" can explicitly or implicitly include one or more of the features.

In addition, the various embodiments in this specification are described in a progressive or parallel manner, and each embodiment focuses on the differences from other embodiments. The same and similar parts between the various embodiments can be referred to each other. For the apparatuses and the electronic devices disclosed in the embodiments, since they correspond to the methods disclosed in the method embodiments, the description is relatively simple, and the relevant parts can be referred to the description of the method embodiments.

The above description of the disclosed embodiments enables professionals in the field to implement or use the present disclosure. Various modifications to these embodiments will be obvious to professionals in the field, and the general principles defined in the specification can be implemented in other embodiments without departing from the spirit or scope of the present disclosure. Therefore, the present disclosure will not be limited to the embodiments shown in the specification, but will conform to the broadest scope consistent with the principles and novel features disclosed in the specification.

What is claimed is:

1. A processing method, comprising:
obtaining node information of a display content and display data of the display content, the node information representing the display content by including, for each of a plurality of parts in a display interface that presents the display content, a part type and region coordinates of an area occupied by the part within the display interface, and the display data being used to present the display content for display output;
in response to first operation information, based on the node information and the display data, generating a target image, the target image representing a target object, the first operation information being associated with a dragging operation to select a portion of the display content; and
in response to second operation information, sending the target image through a connection channel;
wherein the first operation information and the second operation information are both from a target device connected through the connection channel, and are generated in two stages of performing a same operation on the target object.

2. The method according to claim 1, further comprising any one of:
determining that the connection channel is successfully established, and executing the process of obtaining the node information of the display content, the connection channel being used to connect to the target device;
determining that a first mode for the target device is entered, and executing the process of obtaining the node information of the display content, the first mode including sending the display content to the target device to present the display content on a target display screen of the target device;
determine that a second mode for the target device is entered, and executing the process of obtaining the node information of the display content, the second mode including obtaining coordinate information sent by the target device to indicate a movement of the target object through the connection channel, and displaying the target object based on the coordinate information, the target object being used to operate the display content, and the connection channel being connected to the target device; and
obtaining the coordinate information sent by the target device through the connection channel, and executing the process of obtaining the node information of the display content, the coordinate information being used to display the target object.

3. The method according to claim 1, wherein obtaining the node information of the display content comprises:
obtaining multiple nodes contained in the displayed content, the multiple nodes including first-class nodes and second-class nodes, wherein each first-class node includes unit character information and coordinates of an area where a unit character is located in the display content, and each second-class node includes picture description information and coordinates of an area where a picture is located in the display content.

4. The method according to claim 1, wherein in response to the first operation information, generating the target image based on the node information and the display data comprises:
obtaining the first operation information, the first operation information including a first operation event and first operation coordinates;
determining a target area based on the first operation coordinates and the node information;
obtaining target display data corresponding to the target area based on the target area and the display data; and
generating the target image based on the target display data.

5. The method according to claim 1, wherein:
in the first mode, the display content is sent to the target device, and the first operation information and the second operation information generated by the two stages of performing the same operation on the target object presented on the target display screen are obtained through the connection channel when the display content is presented on the target display screen of the target device; and
in the second mode, the display content is not sent to the target device, and the first operation information and the second operation information generated by the two stages of performing an operation on the target object presented on the target display screen by an input device of the target device are obtained through the connection channel when the display content is presented on the target display screen of the target device.

6. The method according to claim 4, further comprising:
generating a thumbnail image based on the target display data, the thumbnail image being smaller than the target image; and
sending the thumbnail image in response to third operation information, the third operation information being generated between the two stages of performing the same operation on the target object.

7. The method according to claim 6, further comprising:

during the sending of the thumbnail image, based on the third operation information, displaying the thumbnail image.

8. A processing apparatus, comprising a memory storing a computer program and a processor configured to execute the computer program to:

obtain node information of a display content and display data of the display content, the node information representing the display content by including, for each of a plurality of parts in a display interface that presents the display content, a part type and region coordinates of an area occupied by the part within the display interface, and the display data and being used to present the display content for display output;

in response to first operation information, based on the node information and the display data, generate a target image, the target image representing a target object, the first operation information being associated with a dragging operation to select a portion of the display content; and in response to second operation information, send the target image through a connection channel;

wherein the first operation information and the second operation information are both from a target device connected through the connection channel, and are generated in two stages of performing a same operation on the target object.

9. The apparatus according to claim 8, wherein the processor is further configured to perform any one of:

determining that the connection channel is successfully established, and executing the process of obtaining the node information of the display content, the connection channel being used to connect to the target device;

determining that a first mode for the target device is entered, and executing the process of obtaining the node information of the display content, the first mode including sending the display content to the target device to present the display content on a target display screen of the target device;

determine that a second mode for the target device is entered, and executing the process of obtaining the node information of the display content, the second mode including obtaining coordinate information sent by the target device to indicate a movement of the target object through the connection channel, and displaying the target object based on the coordinate information, the target object being used to operate the display content, and the connection channel being connected to the target device; and obtaining the coordinate information sent by the target device through the connection channel, and executing the process of obtaining the node information of the display content, the coordinate information being used to display the target object.

10. The apparatus according to claim 8, wherein when obtaining the node information of the display content, the processor is further configured to:

obtain multiple nodes contained in the displayed content, the multiple nodes including first-class nodes and second-class nodes, wherein each first-class node includes unit character information and coordinates of an area where a unit character is located in the display content, and each second-class node includes picture description information and coordinates of an area where a picture is located in the display content.

11. The apparatus according to claim 8, wherein when in response to the first operation information, generating the target image based on the node information and the display data, the processor is further configured to:

obtain the first operation information, the first operation information including a first operation event and first operation coordinates;

determine a target area based on the first operation coordinates and the node information;

obtain target display data corresponding to the target area based on the target area and the display data; and generate the target image based on the target display data.

12. The apparatus according to claim 8, wherein:

in the first mode, the display content is sent to the target device, and the first operation information and the second operation information generated by the two stages of performing the same operation on the target object presented on the target display screen are obtained through the connection channel when the display content is presented on the target display screen of the target device; and in the second mode, the display content is not sent to the target device, and the first operation information and the second operation information generated by the two stages of performing an operation on the target object presented on the target display screen by an input device of the target device are obtained through the connection channel when the display content is presented on the target display screen of the target device.

13. The apparatus according to claim 11, wherein the processor is further configured to:

generate a thumbnail image based on the target display data, the thumbnail image being smaller than the target image; and send the thumbnail image in response to third operation information, the third operation information being generated between the two stages of performing the same operation on the target object.

14. The apparatus according to claim 13, wherein the processor is further configured to:

during the sending of the thumbnail image, based on the third operation information, display the thumbnail image.

15. An electronic device, comprising:

a display screen used to output and display data of a display content and to present the display content;

a connection port used to connect to a target device to form a connection channel between the electronic device and the target device, and to receive various operation information on a target object sent by the target device through the connection channel; and a processor used to execute a computer program stored in a memory to:

obtain node information of a display content and display data of the display content, the node information representing the display content by including, for each of a plurality of parts in a display interface that presents the display content, a part type and region coordinates of an area occupied by the part within the display interface, and the display data being used to present the display content for display output;

in response to first operation information, based on the node information and the display data, generate a target image, the target image representing a target object, the first operation information being associated with a dragging operation to select a portion of the display content; and in response to second operation information, send the target image through a connection channel;

wherein the first operation information and the second operation information are both from a target device connected through the connection channel, and are generated in two stages of performing a same operation on the target object.

16. The electronic device according to claim 15, wherein the processor is further configured to perform any one of:

determining that the connection channel is successfully established, and executing the process of obtaining the node information of the display content, the connection channel being used to connect to the target device;

determining that a first mode for the target device is entered, and executing the process of obtaining the node information of the display content, the first mode including sending the display content to the target device to present the display content on a target display screen of the target device;

determine that a second mode for the target device is entered, and executing the process of obtaining the node information of the display content, the second mode including obtaining coordinate information sent by the target device to indicate a movement of the target object through the connection channel, and displaying the target object based on the coordinate information, the target object being used to operate the display content, and the connection channel being connected to the target device; and obtaining the coordinate information sent by the target device through the connection channel, and executing the process of obtaining the node information of the display content, the coordinate information being used to display the target object.

17. The electronic device according to claim 15, wherein when obtaining the node information of the display content, the processor is further configured to:

obtain multiple nodes contained in the displayed content, the multiple nodes including first-class nodes and second-class nodes, wherein each first-class node includes unit character information and coordinates of an area where a unit character is located in the display content, and each second-class node includes picture description information and coordinates of an area where a picture is located in the display content.

18. The electronic device according to claim 15, wherein when in response to the first operation information, generating the target image based on the node information and the display data, the processor is further configured to:

obtain the first operation information, the first operation information including a first operation event and first operation coordinates;

determine a target area based on the first operation coordinates and the node information;

obtain target display data corresponding to the target area based on the target area and the display data; and generate the target image based on the target display data.

19. The electronic device according to claim 15, wherein:

in the first mode, the display content is sent to the target device, and the first operation information and the second operation information generated by the two stages of performing the same operation on the target object presented on the target display screen are obtained through the connection channel when the display content is presented on the target display screen of the target device; and in the second mode, the display content is not sent to the target device, and the first operation information and the second operation information generated by the two stages of performing an operation on the target object presented on the target display screen by an input device of the target device are obtained through the connection channel when the display content is presented on the target display screen of the target device.

20. The electronic device according to claim 18, wherein the processor is further configured to:

generate a thumbnail image based on the target display data, the thumbnail image being smaller than the target image; and send the thumbnail image in response to third operation information, the third operation information being generated between the two stages of performing the same operation on the target object.

* * * * *